US012654752B2

(12) United States Patent
Matsuyama et al.

(10) Patent No.: US 12,654,752 B2
(45) Date of Patent: Jun. 16, 2026

(54) WHEEL TREAD ROUGHNESS ESTIMATION DEVICE AND WHEEL TREAD ROUGHNESS ESTIMATION METHOD

(71) Applicant: Mitsubishi Electric Corporation, Tokyo (JP)

(72) Inventors: Etsuji Matsuyama, Tokyo (JP); Tsutomu Nishioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 25 days.

(21) Appl. No.: 18/716,165

(22) PCT Filed: Jan. 4, 2022

(86) PCT No.: PCT/JP2022/000032
§ 371 (c)(1),
(2) Date: Jun. 4, 2024

(87) PCT Pub. No.: WO2023/131988
PCT Pub. Date: Jul. 13, 2023

(65) Prior Publication Data
US 2025/0042452 A1 Feb. 6, 2025

(51) Int. Cl.
*B61K 9/12* (2006.01)
*G07C 5/04* (2006.01)

(52) U.S. Cl.
CPC . *B61K 9/12* (2013.01); *G07C 5/04* (2013.01)

(58) Field of Classification Search
CPC ........... B61K 9/12; G07C 5/04; B60T 17/228; B61L 15/0072; B61L 15/0081; B61L 27/60; G01M 17/10
See application file for complete search history.

(56) References Cited

U.S. PATENT DOCUMENTS 4,781,121 A * 11/1988 Kumar .................... B61C 15/08 291/1
2019/0061715 A1* 2/2019 Kato ......................... B60L 7/18
(Continued)

FOREIGN PATENT DOCUMENTS

JP 11153424 * 11/1997 ............. G01B 21/00
JP 2006118912 A 5/2006
WO WO-2023119361 A1 * 6/2023 ............ B60T 8/1761

OTHER PUBLICATIONS

Translation of JP11153424 (Year: 1997).*
(Continued)

*Primary Examiner* — Russell Frejd
(74) *Attorney, Agent, or Firm* — BUCHANAN, INGERSOLL & ROONEY PC

(57) ABSTRACT

A wheel tread roughness estimation device includes a driving information acquisition unit that obtains driving information of a railway vehicle; a vehicle information acquisition unit that obtains vehicle information of the railway vehicle in service; a wheel tread roughness computation unit that determines a set value on the basis of the driving information and the vehicle information and computes an up-to-date wheel tread roughness by adding the set value to a preceding wheel tread roughness indicating a previously computed roughness of a wheel tread; and an output unit that outputs the up-to-date wheel tread roughness computed by the wheel tread roughness computation unit as wheel tread roughness information.

14 Claims, 7 Drawing Sheets

(56) References Cited

U.S. PATENT DOCUMENTS

| | | | | |
|---|---|---|---|---|
| 2021/0078619 A1* | 3/2021 | Morita | B61L 15/0027 | |
| 2021/0146975 A1* | 5/2021 | Davidich | G07C 5/004 | |
| 2023/0083294 A1* | 3/2023 | Snyder | B61L 25/026 | 701/19 |

OTHER PUBLICATIONS

International Search Report (PCT/ISA/210) with translation and Written Opinion (PCT/ISA/237) mailed on Feb. 15, 2022, by the Japanese Patent Office as the International Searching Authority for International Application No. PCT/JP2022/000032. (8 pages).

* cited by examiner

FIG.3

| CHANGE IN TREAD ROUGHNESS | WHEN EMPTY (AS PRESSURE: 300 TO 400kPa) | 1 TO 40km/h | 41 TO 80km/h | 81 TO 120km/h |
|---|---|---|---|---|
| SET VALUE 1 | IN STATE OF POWER RUNNING OR COASTING | -0.0001mm | -0.0002mm | -0.0003mm |
| SET VALUE 2 | IN STATE OF SERVICE B WITH REGENERATIVE BRAKE OFF | +0.01mm | +0.02mm | +0.03mm |
| SET VALUE 3 | IN STATE OF EMERGENCY BRAKING | +0.01mm | +0.02mm | +0.03mm |
| SET VALUE 4 | IN STATE OF SERVICE B WITH TREAD ROUGHENING CONTROL OFF | -0.001mm | -0.002mm | -0.003mm |
| SET VALUE 5 | IN STATE OF SERVICE B WITH TREAD ROUGHENING CONTROL ON | +0.002mm | +0.003mm | +0.004mm |
| SET VALUE 6 | OTHER THAN ABOVE | NO CHANGE | NO CHANGE | NO CHANGE |

| CHANGE IN TREAD ROUGHNESS | WHEN LOADED (AS PRESSURE: 400 TO 500kPa) | 1 TO 40km/h | 41 TO 80km/h | 81 TO 120km/h |
|---|---|---|---|---|
| SET VALUE 1 | IN STATE OF POWER RUNNING OR COASTING | -0.0002mm | -0.0003mm | -0.0004mm |
| SET VALUE 2 | IN STATE OF SERVICE B WITH REGENERATIVE BRAKE OFF | +0.02mm | +0.03mm | +0.04mm |
| SET VALUE 3 | IN STATE OF EMERGENCY BRAKING | +0.02mm | +0.03mm | +0.04mm |
| SET VALUE 4 | IN STATE OF SERVICE B WITH TREAD ROUGHENING CONTROL OFF | -0.002mm | -0.003mm | -0.004mm |
| SET VALUE 5 | IN STATE OF SERVICE B WITH TREAD ROUGHENING CONTROL ON | +0.003mm | +0.004mm | +0.005mm |
| SET VALUE 6 | OTHER THAN ABOVE | NO CHANGE | NO CHANGE | NO CHANGE |

| CHANGE IN TREAD ROUGHNESS | WHEN FULL (AS PRESSURE: 500 TO 600kPa) | 1 TO 40km/h | 41 TO 80km/h | 81 TO 120km/h |
|---|---|---|---|---|
| SET VALUE 1 | IN STATE OF POWER RUNNING OR COASTING | -0.0003mm | -0.0004mm | -0.0005mm |
| SET VALUE 2 | IN STATE OF SERVICE B WITH REGENERATIVE BRAKE OFF | +0.03mm | +0.04mm | +0.05mm |
| SET VALUE 3 | IN STATE OF EMERGENCY BRAKING | +0.03mm | +0.04mm | +0.05mm |
| SET VALUE 4 | IN STATE OF SERVICE B WITH TREAD ROUGHENING CONTROL OFF | -0.003mm | -0.004mm | -0.005mm |
| SET VALUE 5 | IN STATE OF SERVICE B WITH TREAD ROUGHENING CONTROL ON | +0.004mm | +0.005mm | +0.006mm |
| SET VALUE 6 | OTHER THAN ABOVE | NO CHANGE | NO CHANGE | NO CHANGE |

WHEEL TREAD ROUGHNESS ESTIMATION DEVICE AND WHEEL TREAD ROUGHNESS ESTIMATION METHOD

FIELD

The present disclosure relates to a wheel tread roughness estimation device and a wheel tread roughness estimation method intended for wheel treads of railway vehicles.

BACKGROUND

A regenerative brake and an air brake (or pneumatic brake) have been used in combination as brakes for a railway vehicle, with the regenerative brake mainly used under normal conditions. The air brake is used for only tens of milliseconds until the regenerative brake starts or to prevent a stopping railway vehicle from rolling to move. In order to provide an immediate braking effect during regenerative braking of the railway vehicle, the air brake is placed in a precharge state by being operated with a precharge brake cylinder (BC) pressure. In cases where a tread brake device is used as the air brake, a pressing position in the precharge state is where a friction material is in light contact with a wheel tread of the railway vehicle. Therefore, surface roughness of the wheel tread decreases, causing the wheel tread to become a mirror surface. When wheel treads become mirror surfaces, problems arise, including insufficient adhesion that results in a slide when the air brake is operated for the railway vehicle with a high speed or insufficient decelerating to bring to a specified deceleration when emergency braking is operated for the railway vehicle in an emergency state, or the like. In general, even during normal running of the railway vehicle, friction between a rail surface and the wheel tread may decrease the surface roughness of the wheel tread, so that the wheel tread advances to become the mirror surface and causes similar problems. Therefore, when the wheel tread of the railway vehicle becomes the mirror surface, wheel tread roughening is required, using a tread brake, namely the air brake that presses the friction material against the wheel tread.

Accurate roughening control for the railway vehicle requires accurate information on the wheel tread roughness. For example, Patent Literature 1 discloses a technique for a wheel measurement device to measure a wheel profile (or a wheel shape) of a railway vehicle running on a rail by directing a line beam to a wheel from a line illumination unit, capturing an image of reflected light of the line beam, and processing the captured image.

CITATION LIST

Patent Literature

Patent Literature 1: Japanese Patent Application Laid-open No. 2006-118912

SUMMARY OF INVENTION

Problem to be Solved by the Invention

However, the above conventional technique requires installation of a high-accuracy sensor near wheels. Therefore, a measurement result may be significantly influenced by vibration of the running railway vehicle, leading to a problematic decrease in accuracy.

The present disclosure has been made in view of the above, and an object of the present disclosure is to obtain a wheel tread roughness estimation device capable of accurate estimation of wheel tread roughness without being affected by vibration of a railway vehicle even during running.

Means to Solve the Problem

In order to solve the above problem and achieve the object, a wheel tread roughness estimation device according to the present disclosure includes: a driving information acquisition unit to obtain driving information of a railway vehicle; a vehicle information acquisition unit to obtain vehicle information of the railway vehicle in service; a wheel tread roughness computation unit to determine a set value on a basis of the driving information and the vehicle information and compute an up-to-date wheel tread roughness by adding the set value to a preceding wheel tread roughness indicating a previously computed roughness of a wheel tread; and an output unit to output the up-to-date wheel tread roughness computed by the wheel tread roughness computation unit as wheel tread roughness information.

Effect of the Invention

The wheel tread roughness estimation device according to the present disclosure has an effect of accurately estimating the wheel tread roughness without being affected by vibration of the railway vehicle even during running.

BRIEF DESCRIPTION OF DRAWINGS

FIG. 3 is a diagram illustrating an example of a set value table stored in a database of the wheel tread roughness estimation device according to the first embodiment.

DESCRIPTION OF EMBODIMENTS

With reference to the drawings, a detailed description is hereinafter provided of wheel tread roughness estimation devices and wheel tread roughness estimation methods according to embodiments of the present disclosure.

First Embodiment

Figure 1:
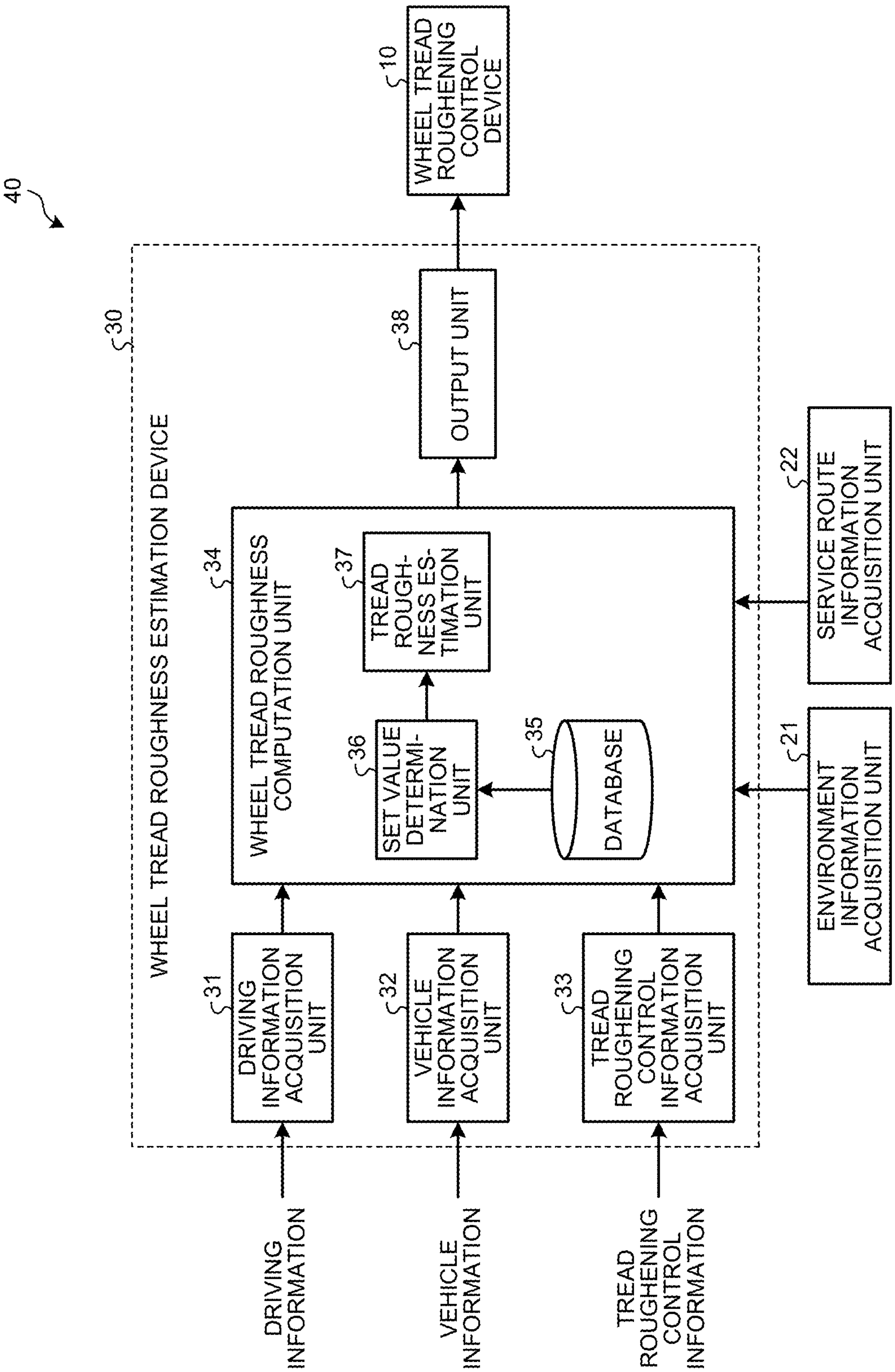
FIG. 1 is a block diagram illustrating a configuration example of a wheel tread roughness estimation device according to a first embodiment.

FIG. 1 is a block diagram illustrating a configuration example of a wheel tread roughness estimation device 30 according to a first embodiment. The wheel tread roughness estimation device 30 includes a driving information acquisition unit 31, a vehicle information acquisition unit 32, a tread roughening control information acquisition unit 33, a wheel tread roughness computation unit 34, and an output unit 38. The wheel tread roughness computation unit 34 includes a database 35, a set value determination unit 36, and a tread roughness estimation unit 37. The wheel tread roughness estimation device 30 is connected to a wheel tread roughening control device 10, an environment information acquisition unit 21, and a service route information acquisition unit 22. As illustrated in FIG. 1, the wheel tread roughening control device 10 and the wheel tread roughness estimation device 30 constitute a wheel tread roughness management system 40.

The driving information acquisition unit 31 obtains driving information of a railway vehicle from a driver's stand (or a driver's seat) (not illustrated) that is installed on the railway vehicle, a vehicle information management device (not illustrated), or the like. The driving information is, for example, information on braking operation performed by a driver of the railway vehicle. Examples of the information on the braking operation include information indicating whether the railway vehicle is power running or coasting, information indicating which brake is used an air brake or a regenerative brake or a ratio between the air brake and the regenerative brake, information indicating which braking is used service braking or emergency braking, and information on a current notch, or the like. The driving information acquisition unit 31 outputs the obtained driving information to the wheel tread roughness computation unit 34.

The vehicle information acquisition unit 32 obtains vehicle information of the railway vehicle in service. For example, the vehicle information acquisition unit 32 obtains, from the vehicle information management device or sensors installed on the railway vehicle, information including air suspension (AS) pressure that is variable load pressure representing a congestion degree of the railway vehicle, BC pressure, and speed of the railway vehicle, or the like as the vehicle information. The vehicle information acquisition unit 32 outputs the obtained vehicle information to the wheel tread roughness computation unit 34.

The tread roughening control information acquisition unit 33 obtains, from the wheel tread roughening control device 10, tread roughening control information that is information on wheel tread roughening control in the wheel tread roughening control device 10. The tread roughening control information is, for example, information indicating a current ON-OFF status of the tread roughening control in the wheel tread roughening control device 10. The tread roughening control information acquisition unit 33 outputs the obtained tread roughening control information to the wheel tread roughness computation unit 34.

The wheel tread roughness computation unit 34 determines a set value by selecting, on the basis of the driving information obtained from the driving information acquisition unit 31, the vehicle information obtained from the vehicle information acquisition unit 32, and the tread roughening control information obtained from the tread roughening control information acquisition unit 33, the corresponding set value from a set value table configured according to the driving information, the vehicle information, and the tread roughening control information. The wheel tread roughness computation unit 34 computes an up-to-date wheel tread roughness by adding the set value to a preceding wheel tread roughness indicating a previously computed roughness of a wheel tread. It is to be noted that without using all of the driving information, the vehicle information, and the tread roughening control information, the wheel tread roughness computation unit 34 may select, from the set value table, the corresponding set value based on at least one of the driving information, the vehicle information, or the tread roughening control information, when determining the set value.

The database 35 stores the set value table, which is used by the wheel tread roughness computation unit 34. The database 35 may store the driving information obtained from the driving information acquisition unit 31, the vehicle information obtained from the vehicle information acquisition unit 32, the tread roughening control information obtained from the tread roughening control information acquisition unit 33, environment information obtained from the environment information acquisition unit 21, and service route information obtained from the service route information acquisition unit 22. An installation location of the database 35 is not particularly limited. The database 35 may be installed in a brake control unit 103 illustrated in FIG. 2 or another location or externally to the railway vehicle 100.

Figure 2:
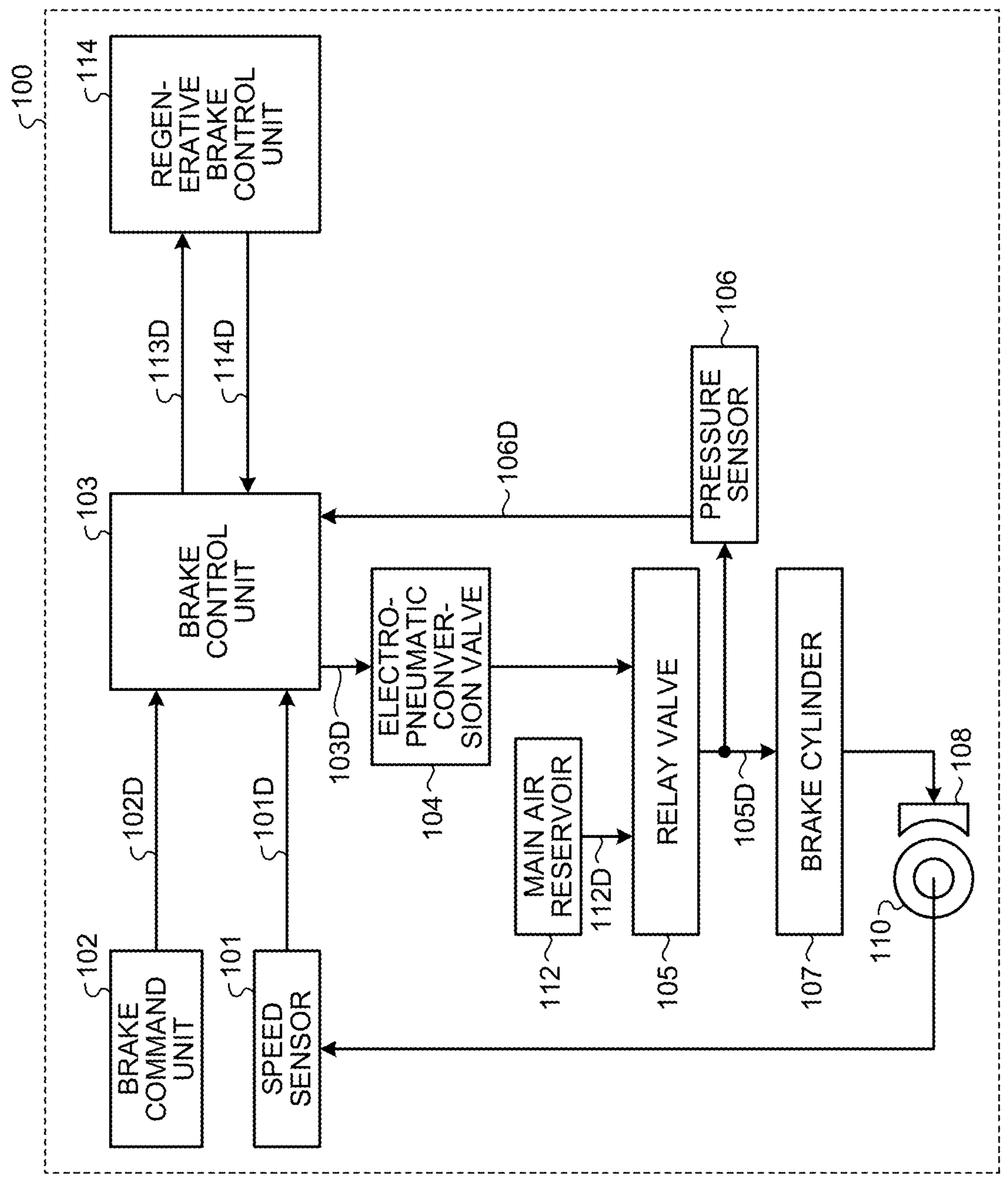
FIG. 2 is a diagram illustrating a configuration example of a brake system of a railway vehicle equipped with the wheel tread roughness estimation device and a wheel tread roughening control device according to the first embodiment.

A brief description is provided here of a brake system of the railway vehicle, which is equipped with the wheel tread roughness estimation device 30 and the wheel tread roughening control device 10. FIG. 2 is a diagram illustrating a configuration example of the brake system of the railway vehicle 100, which is equipped with the wheel tread roughness estimation device 30 and the wheel tread roughening control device 10 according to the first embodiment. A speed sensor 101 is installed on each of a front and a rear truck of each railway vehicle 100, obtains a speed signal 101D of each wheel 110, and outputs the speed signal 101D to the brake control unit 103. A brake command unit 102 outputs a brake command 102D for obtaining a specified deceleration. The brake control unit 103 obtains the brake command 102D output from the brake command unit 102, a variable load signal output from a variable load device (not illustrated) that detects weight of each railway vehicle 100, or the like, and outputs a specified pressure control signal 103D. The pressure control signal 103D is output from the brake control unit 103 through an electro-pneumatic conversion valve 104 to a relay valve 105 and is used for production of a brake cylinder pressure 105D. The electro-pneumatic conversion valve 104 converts the pressure control signal 103D, which is an electrical signal output from the brake control unit 103, into an air signal of a specified pressure. The relay valve 105 amplifies the pressure control signal 103D that has been converted into the air signal to a specified value to improve responsiveness of the brake cylinder pressure 105D. The relay valve 105 is connected to a main air reservoir 112. Since compressed air, which is air having a specified pressure, is stored in the main air reservoir 112, the relay valve 105 is enabled to produce the specified brake cylinder pressure 105D by outputting the compressed air 112D corresponding to the pressure control signal 103D.

A pressure sensor 106 detects the brake cylinder pressure 105D and generates a feedback command 106D based on the brake cylinder pressure 105D to return the feedback command 106D to the brake control unit 103. A brake cylinder 107 causes a brake shoe 108 to press against the wheel 110 in accordance with intensity of the brake cylinder pressure 105D. The brake shoe 108 is a friction material having a specified friction coefficient. Braking force of the railway vehicle 100 can be derived from multiplication of the friction coefficient of the brake shoe 108 by the brake cylinder pressure 105D. The brake control unit 103 computes required braking force from variable load information obtained from an air suspension pressure sensor (not illustrated) and target deceleration based on the brake command 102D and outputs a regenerative pattern signal 113D to a regenerative brake control unit 114. The regenerative brake control unit 114, which is installed in a main circuit control device (not illustrated), outputs actual regenerative braking force corresponding to actual torque as a regenerative feedback signal 114D to the brake control unit 103. The brake control unit 103 performs BC pressure control by subtracting the value of the regenerative feedback signal 114D from the required braking force to obtain an air brake supplement quantity and outputting the air brake supplement quantity as the pressure control signal 103D to the electro-pneumatic conversion valve 104.

When the air brake is frequently used, the wheel tread of the railway vehicle 100 is roughened, thus enabling desired braking force to be secured, with a mirror surface condition of the wheel 110 also eliminated. On the other hand, heavy use of the air brake on the railway vehicle 100 does not allow for effective use of the regenerative brake, resulting in no energy-saving effect. Therefore, the wheel tread roughening control device 10 effectively uses the regenerative brake during normal service braking, and when the wheel 110 is in the mirror surface condition, the wheel tread roughening control device 10 uses the air brake that causes the brake shoe 108, which is the friction material, to press against the wheel 110 so as to roughen the tread of the wheel 110, thus eliminating the mirror surface condition of the wheel 110. The wheel tread roughness estimation device 30 estimates and outputs, to the wheel tread roughening control device 10, the wheel tread roughness as wheel tread roughness information.

A return is made to the description of FIG. 1. The set value determination unit 36 determines the set value by selecting, on the basis of the driving information, the vehicle information, and the tread roughening control information, the set value that corresponds to the driving information, the vehicle information, and the tread roughening control information from the set value table, which is stored in the database 35. Without using all of the driving information, the vehicle information, and the tread roughening control information, the set value determination unit 36 may select, from the set value table, the corresponding set value based on the at least one of the driving information, the vehicle information, or the tread roughening control information, when determining the set value. The set value determination unit 36 outputs the determined set value to the tread roughness estimation unit 37.

The tread roughness estimation unit 37 computes the up-to-date wheel tread roughness by adding the set value determined by the set value determination unit 36 to the preceding wheel tread roughness, thus estimating the wheel tread roughness of the railway vehicle 100.

The output unit 38 outputs the up-to-date wheel tread roughness computed by the wheel tread roughness computation unit 34 as the wheel tread roughness information to the wheel tread roughening control device 10. While the output unit 38 outputs the wheel tread roughness information to the wheel tread roughening control device 10 in the example of FIG. 1, the wheel tread roughening control device 10 is not the limiting destination for the output of the wheel tread roughness information. For example, when the wheel tread roughness information is used as information for maintenance or the like, the output unit 38 may output the wheel tread roughness information to a storage unit, such as a memory (not illustrated), or transmit the wheel tread roughness information to a server or the like that collects data for the maintenance via a communication device (not illustrated).

Using the wheel tread roughness information estimated by the wheel tread roughness estimation device 30, the wheel tread roughening control device 10 performs ON-OFF control of the tread roughening control.

The environment information acquisition unit 21 obtains the environment information including weather, temperature, humidity, and others, around the railway vehicle 100. This is because the weather, the temperature, the humidity, and others affect effectiveness of the brake on the railway vehicle 100. The environment information acquisition unit 21 may be installed on the railway vehicle 100 or in a train operation management system disposed on the ground, or the like. The environment information acquisition unit 21 outputs the obtained environment information to the wheel tread roughness estimation device 30.

The service route information acquisition unit 22 obtains the service route information, such as information on a route on which the railway vehicle 100 runs. This is because presence of any other railway vehicle 100, such as a preceding railway vehicle 100 or a following railway vehicle 100, is significant for application of the regenerative brake on the railway vehicle 100, with frequency of the presence of such other railway vehicle 100 differing, depending on whether the route on which the railway vehicle 100 runs is suburban or urban. The service route information acquisition unit 22 may be installed on the railway vehicle 100 or in the train operation management system disposed on the ground, or the like. The service route information acquisition unit 22 outputs the obtained service route information to the wheel tread roughness estimation device 30.

A description is provided here of the set value table stored in the database 35. FIG. 3 is a diagram illustrating an example of the set value table stored in the database 35 of the wheel tread roughness estimation device 30 according to the first embodiment. As illustrated in FIG. 3, the database 35 stores the above-mentioned set value table where set values are entered for each AS pressure and each speed. For example, when the AS pressure is 350 kPa, with the speed of the railway vehicle 100 being 50 km/h, the set value determination unit 36 obtains −0.0002 mm as set value 1, +0.02 mm as set value 2, +0.02 mm as set value 3, −0.002 mm as set value 4, and +0.003 mm as set value 5. Regardless of the AS pressure and the speed, set value 6 means "no change". As illustrated in FIG. 3, the wheel tread roughness computation unit 34 is to have a negative value for the set value when the wheel tread is in a situation of becoming a mirror surface and a positive value for the set value when the wheel tread is in a situation of becoming rough. Values for each of those set values in the set value table stored in the database 35 can be appropriately set or changed, for example, by a person in charge at a railway company that operates the railway vehicle 100 by means of the wheel tread roughness estimation device 30 or another device, such as a device external to the wheel tread roughness estimation device 30. Examples of the device external to the wheel tread roughness estimation device 30 include a vehicle information monitoring and analysis system, a train control and management system, and a brake control unit (BCU), or the like.

While the set value table illustrated in FIG. 3 is divided into three levels with respect to the AS pressure and the speed by thresholds, the set value table may be divided into two levels, or four or more levels. While the set value table illustrated in FIG. 3 has the set values entered for each AS pressure and each speed, set values may be specified in the set value table solely for the AS pressure or solely for the speed. The set value table may be defined, using, for example, the BC pressure, instead of the AS pressure.

The running of the railway vehicle 100 is influenced by the environment information, namely the weather, the temperature, the humidity, and others, and is also influenced by the service route information, namely the route on which the railway vehicle 100 runs, or the like. Therefore, the database 35 may store a set value table for each of conditions set for environment information and a set value table for each of conditions set for service route information. In that case, the set value determination unit 36 determines set values by selecting the set values from the set value tables that match the environment information and the service route information. As described above, the wheel tread roughness computation unit 34 may obtain the environment information including at least one of the weather, the temperature, or the humidity, and determine the set value, using the environment information. The wheel tread roughness computation unit 34 may obtain the service route information, which is the information on the route where the railway vehicle 100 runs, and determine the set value, using the service route information.

In a case of, for example, rainy weather or a lower temperature, the wheel tread easily becomes a mirror surface compared to when the weather is fine or when the temperature is higher. In view of this matter, the set value table prestored in the database 35 is configured with set values that allow for the output of wheel tread roughness information that causes the tread roughening control to be easily ON to the wheel tread roughening control device 10. The regenerative brake is assumed to be more frequent on urban routes than on suburban routes. In view of this matter, the set value table prestored in the database 35 is configured with set values that allow for the output of wheel tread roughness information that causes the tread roughening control to be easily ON to the wheel tread roughening control device 10. For a train made up of a plurality of the railway vehicles 100, the wheel tread roughness computation unit 34 may have the database 35 store a set value table corresponding to the number of railway vehicles 100 making up the train and may change the set value table to be used in accordance with the number of railway vehicles 100.

Figure 4:
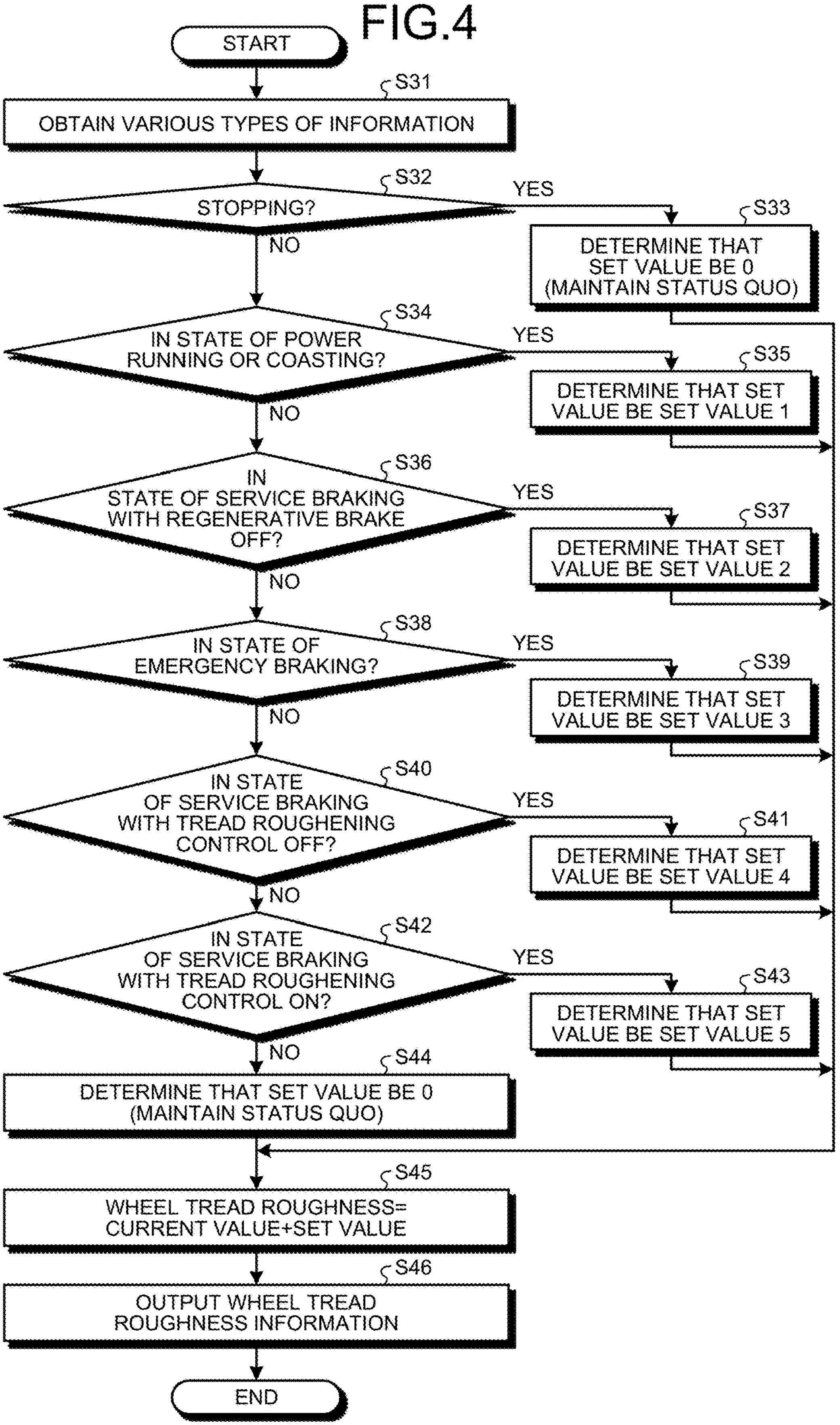
FIG. 4 is a flowchart illustrating an operation of the wheel tread roughness estimation device according to the first embodiment.

A description is provided of how the wheel tread roughness estimation device 30 operates. FIG. 4 is a flowchart illustrating an operation of the wheel tread roughness estimation device 30 according to the first embodiment. The wheel tread roughness estimation device 30 obtains the various types of information (step S31). Specifically, in the wheel tread roughness estimation device 30, the driving information acquisition unit 31 obtains the driving information, the vehicle information acquisition unit 32 obtains the vehicle information, and the tread roughening control information acquisition unit 33 obtains the tread roughening control information.

In the wheel tread roughness computation unit 34, the set value determination unit 36 determines whether or not the railway vehicle 100 is stopping (step S32). The set value determination unit 36 can determine whether or not the railway vehicle 100 is stopping on the basis of the speed of the railway vehicle 100 that is included in the vehicle information. In cases where position information of the railway vehicle 100 is obtained, the set value determination unit 36 may use the position information of the railway vehicle 100 to determine whether or not the railway vehicle 100 is stopping. If the railway vehicle 100 is stopping (step S32: Yes), the set value determination unit 36 determines that the set value be 0 to maintain the current status (step S33).

If the railway vehicle 100 is running (step S32: No), the set value determination unit 36 determines whether the railway vehicle 100 is in a state of power running or coasting or not (step S34). The set value determination unit 36 can determine whether or not the railway vehicle 100 is in the state of power running or coasting on the basis of the driving information. If the railway vehicle 100 is in the state of power running or coasting (step S34: Yes), the set value determination unit 36 selects a corresponding set value from the set value table stored in the database 35 to determine that the set value be set value 1 (step S35).

If the railway vehicle 100 is not in the state of power running or coasting (step S34: No), the set value determination unit 36 determines whether the railway vehicle 100 is in a state of service braking with the regenerative brake OFF or not (step S36). The set value determination unit 36 can determine whether or not the railway vehicle 100 is in the state of service braking with the regenerative brake OFF on the basis of the driving information. If the railway vehicle 100 is in the state of service braking with the regenerative brake OFF (step S36: Yes), the set value determination unit 36 selects a corresponding set value from the set value table stored in the database 35 to determine that the set value be set value 2 (step S37).

If the railway vehicle 100 is not in the state of service braking with the regenerative brake OFF (step S36: No), the set value determination unit 36 determines whether emergency braking is in progress or not (step S38). The set value determination unit 36 can determine whether or not the railway vehicle 100 is in the state of emergency braking on the basis of the driving information. If the emergency braking is in progress (step S38: Yes), the set value determination unit 36 selects a corresponding set value from the set value table stored in the database 35 to determine that the set value be set value 3 (step S39).

If the emergency braking is not in progress (step S38: No), the set value determination unit 36 determines whether or not the service braking is in progress with the tread roughening control OFF (step S40). The set value determination unit 36 can determine whether or not the railway vehicle 100 is in the state of service braking with the tread roughening control OFF on the basis of the driving information and the tread roughening control information. If the service braking is in progress with the tread roughening control OFF (step S40: Yes), the set value determination unit 36 selects a corresponding set value from the set value table stored in the database 35 to determine that the set value be set value 4 (step S41).

If the state of service braking with the tread roughening control OFF is not the case (step S40: No), the set value determination unit 36 determines whether or not the service braking is in progress with the tread roughening control ON (step S42). The set value determination unit 36 can determine whether or not the railway vehicle 100 is in the state of service braking with the tread roughening control ON on the basis of the driving information and the tread roughening control information. If the service braking is in progress with the tread roughening control ON (step S42: Yes), the set value determination unit 36 selects a corresponding set value from the set value table stored in the database 35 to determine that the set value be set value 5 (step S43). If the service braking is not in progress with the tread roughening control ON (step S42: No), the set value determination unit 36 determines that the set value be 0 to maintain the current status (the status quo) (step S44).

The set value determination unit 36 outputs the set value determined at step S33, S35, S37, S39, S41, S43, or S44 to the tread roughness estimation unit 37. The tread roughness estimation unit 37 computes an up-to-date wheel tread roughness by adding the set value to the previously computed wheel tread roughness which is the current value (step S45). For initial computation after the railway vehicle 100 begins operating, the tread roughness estimation unit 37 of the wheel tread roughness computation unit 34 uses, as the preceding wheel tread roughness, the up-to-date wheel tread roughness last computed in a preceding operation or a wheel tread roughness measured in an inspection. The up-to-date wheel tread roughness last computed in the preceding operation or the wheel tread roughness measured in the inspection may be retained by the set value determination unit 36 or retained by the BCU of the railway vehicle 100, or the like. The tread roughness estimation unit 37 outputs the computed up-to-date wheel tread roughness to the output unit 38. The output unit 38 outputs the up-to-date wheel tread roughness obtained from the tread roughness estimation unit 37 as the wheel tread roughness information (step S46).

A description is provided next of a hardware configuration of the wheel tread roughness estimation device 30 according to the first embodiment. The driving information acquisition unit 31, the vehicle information acquisition unit 32, the tread roughening control information acquisition unit 33, the wheel tread roughness computation unit 34, and the output unit 38 of the wheel tread roughness estimation device 30 are implemented with processing circuitry. The processing circuitry may include a memory that stores programs and a processor that executes the programs stored in the memory or may be dedicated hardware. The processing circuitry is also referred to as control circuitry.

Figure 5:
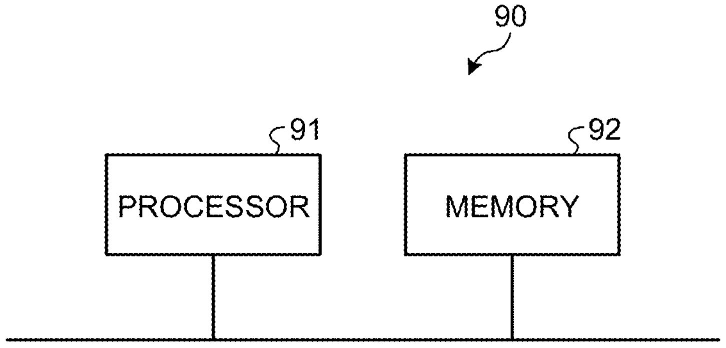
FIG. 5 is a diagram illustrating a configuration example of processing circuitry implemented with a processor and a memory as processing circuitry that implements the wheel tread roughness estimation device according to the first embodiment.

FIG. 5 is a diagram illustrating a configuration example of processing circuitry 90 implemented with a processor 91 and a memory 92 as the processing circuitry that implements the wheel tread roughness estimation device 30 according to the first embodiment. The processing circuitry 90 illustrated in FIG. 5 is control circuitry and includes the processor 91 and the memory 92. For the processing circuitry 90 that includes the processor 91 and the memory 92, the functions of the processing circuitry 90 are implemented with software, firmware, or a combination of software and firmware. The software or the firmware is described as programs and is stored in the memory 92. In the processing circuitry 90, the processor 91 reads and executes the programs stored in the memory 92 to implement the functions. This means that the memory 92 is included in the processing circuitry 90 to store the programs that result in the execution of the operations of the wheel tread roughness estimation device 30. These programs can be said to be programs that cause the functions that the processing circuitry 90 implements to be performed by the wheel tread roughness estimation device 30. These programs may be stored in a storage medium and provided or may be provided by another means such as a communication medium.

The above programs can also be said to cause the wheel tread roughness estimation device 30 to perform a first step of obtaining, with the driving information acquisition unit 31, the driving information of the railway vehicle 100; a second step of obtaining, with the vehicle information acquisition unit 32, the vehicle information of the railway vehicle 100 in service; a third step of determining, with the wheel tread roughness computation unit 34, the set value on the basis of the driving information and the vehicle information and computing, with the wheel tread roughness computation unit 34, the up-to-date wheel tread roughness by adding the set value to the preceding wheel tread roughness, which indicates the previously computed roughness of the wheel tread; and a fourth step of outputting, with the output unit 38, the up-to-date wheel tread roughness computed in the third step as the wheel tread roughness information.

Here examples of the processor 91 include a central processing unit (CPU), a processing unit, an arithmetic unit, a microprocessor, a microcomputer, and a digital signal processor (DSP), or the like. Examples that each correspond to the memory 92 include nonvolatile and volatile semiconductor memories, such as a random-access memory (RAM), a read-only memory (ROM), a flash memory, an erasable programmable ROM (EPROM), and an electrically EPROM (EEPROM) (registered trademark), a magnetic disk, a flexible disk, an optical disk, a compact disk, a mini disk, and a digital versatile disc (DVD), or the like.

Figure 6:
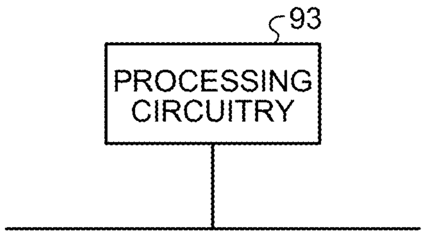
FIG. 6 is a diagram illustrating a configuration example of processing circuitry configured as dedicated hardware to serve as the processing circuitry that implements the wheel tread roughness estimation device according to the first embodiment.

FIG. 6 is a diagram illustrating a configuration example of processing circuitry 93 configured as dedicated hardware to serve as the processing circuitry that implements the wheel tread roughness estimation device 30 according to the first embodiment. Examples that each correspond to the processing circuitry 93 illustrated in FIG. 6 include a single circuit, a composite circuit, a programmed processor, a parallel programmed processor, an application-specific integrated circuit (ASIC), a field-programmable gate array (FPGA), and combinations of these. The processing circuitry 93 may be realized partly by dedicated hardware and partly by software or firmware. By including the dedicated hardware, the software, the firmware or a combination of these, the processing circuitry 93 is capable of implementing the above functions.

As described above, the wheel tread roughness estimation device 30 according to the present embodiment determines the set value by selecting, using the driving information, the vehicle information, and the tread roughening control information, the set value from the set value table, computes the up-to-date wheel tread roughness by adding the set value to the preceding wheel tread roughness, and outputs the up-to-date wheel tread roughness as the wheel tread roughness information to the wheel tread roughening control device 10. Therefore, the wheel tread roughness estimation device 30 is capable of accurate estimation of the wheel tread roughness without being affected by vibration of the railway vehicle 100 even during running.

Second Embodiment

In the first embodiment, the wheel tread roughness estimation device 30 determines the set value by selecting the set value from the set value table prestored in the database 35. In a second embodiment, a description is provided of a case of a wheel tread roughness estimation device that determines a set value by computation.

Figure 7:
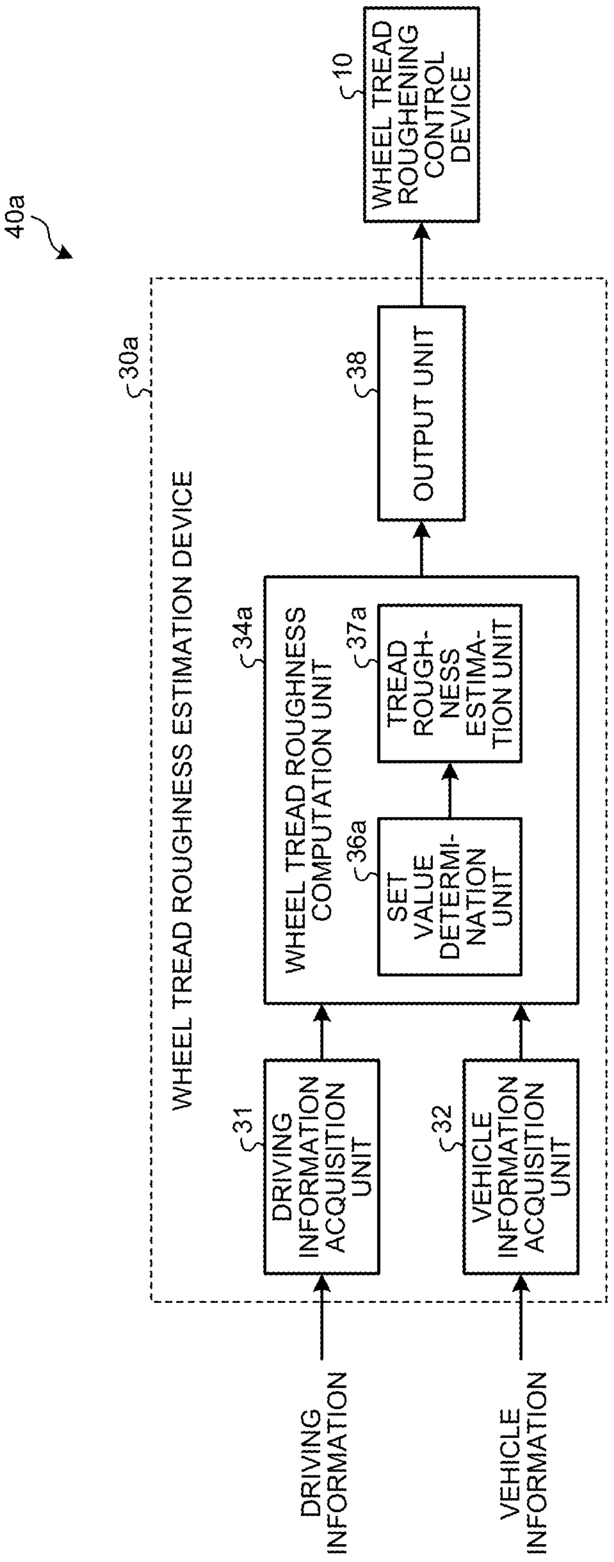
FIG. 7 is a block diagram illustrating a configuration example of a wheel tread roughness estimation device according to a second embodiment.

FIG. 7 is a block diagram illustrating a configuration example of the wheel tread roughness estimation device 30*a* according to the second embodiment. The wheel tread roughness estimation device 30*a* includes the driving information acquisition unit 31, the vehicle information acquisition unit 32, a wheel tread roughness computation unit 34*a*, and the output unit 38. The wheel tread roughness computation unit 34*a* includes a set value determination unit 36*a* and a tread roughness estimation unit 37*a*. The wheel tread roughness estimation device 30*a* is connected to the wheel tread roughening control device 10. As illustrated in FIG. 7, the wheel tread roughening control device 10 and the wheel tread roughness estimation device 30*a* constitute a wheel tread roughness management system 40*a*.

The wheel tread roughness computation unit 34*a* determines a set value by computing the set value based on the driving information obtained from the driving information acquisition unit 31 and the vehicle information obtained from the vehicle information acquisition unit 32. The wheel tread roughness computation unit 34*a* computes an up-to-date wheel tread roughness by adding the set value to a preceding wheel tread roughness indicating a previously computed roughness of a wheel tread. Without using all of the driving information and the vehicle information, the wheel tread roughness computation unit 34*a* may compute a set value based on at least one of the driving information and the vehicle information when determining the set value.

The set value determination unit 36*a* determines the set value by computing the set value based on the driving information and the vehicle information. Without using all of the driving information and the vehicle information, the set value determination unit 36*a* may compute the set value based on the at least one of the driving information and the vehicle information when determining the set value. The set value determination unit 36*a* outputs the determined set value to the tread roughness estimation unit 37*a*.

The tread roughness estimation unit 37*a* computes the up-to-date wheel tread roughness by adding the set value determined by the set value determination unit 36*a* to the preceding wheel tread roughness, thus estimating the wheel tread roughness of the railway vehicle 100.

Figure 8:
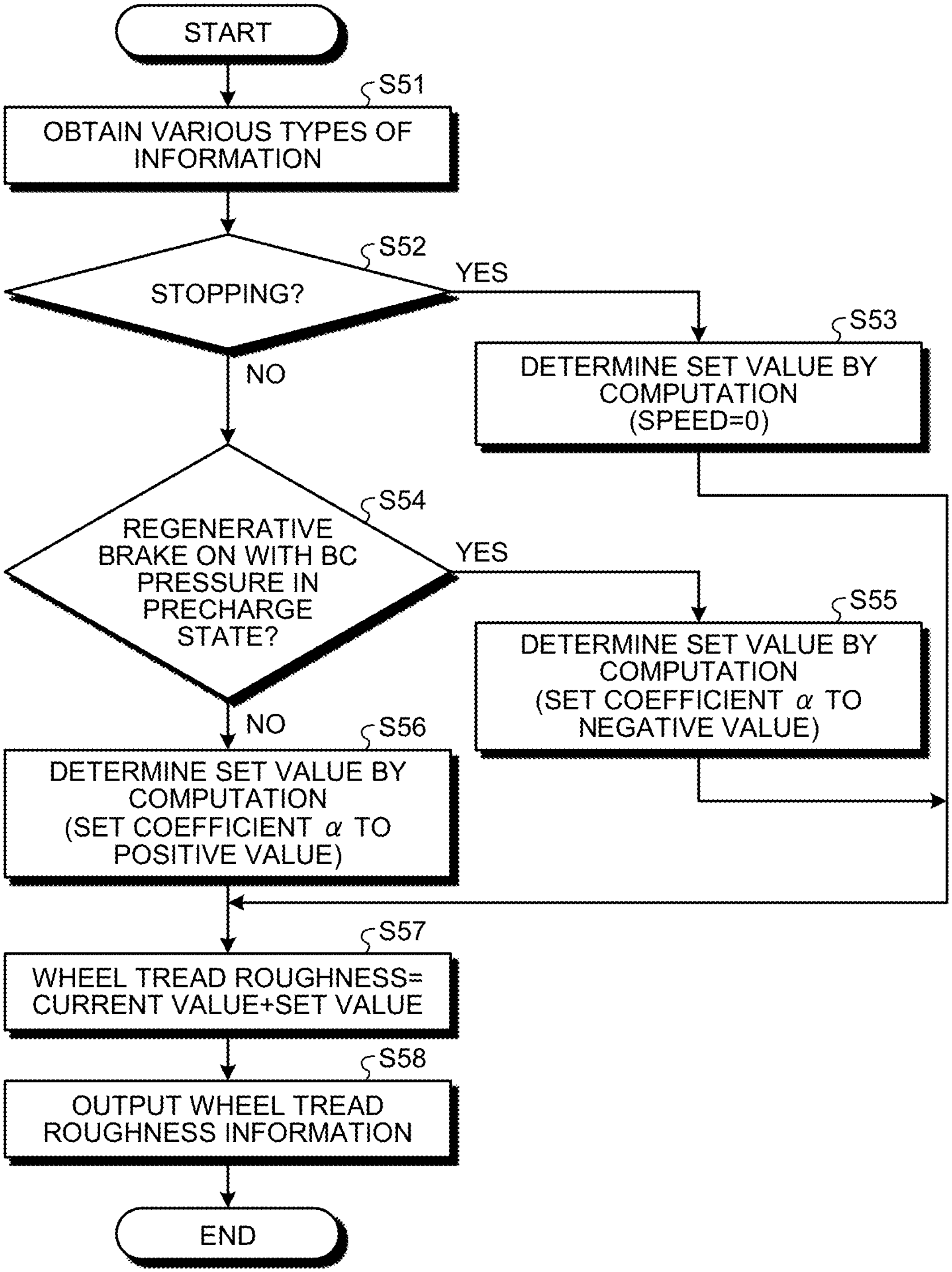
FIG. 8 is a flowchart illustrating an operation of the wheel tread roughness estimation device according to the second embodiment.

A description is provided of how the wheel tread roughness estimation device 30*a* operates. FIG. 8 is a flowchart illustrating an operation of the wheel tread roughness estimation device 30*a* according to the second embodiment. The wheel tread roughness estimation device 30*a* obtains the various types of information (step S51). Specifically, in the wheel tread roughness estimation device 30*a*, the driving information acquisition unit 31 obtains the driving information, and the vehicle information acquisition unit 32 obtains the vehicle information.

The set value determination unit 36*a* of the wheel tread roughness computation unit 34*a* determines whether or not the railway vehicle 100 is stopping (step S52). The set value determination unit 36*a* can determine whether or not the railway vehicle 100 is stopping on the basis of the speed of the railway vehicle 100 that is included in the vehicle information. In cases where position information of the railway vehicle 100 is obtained, the set value determination unit 36*a* may use the position information of the railway vehicle 100 to determine whether or not the railway vehicle 100 is stopping. If the railway vehicle 100 is stopping (step S52: Yes), the set value determination unit 36*a* determines a set value by computing the set value (step S53). In this case, the set value determination unit 36*a* computes the set value according to Formula (1).

$$\text{Set value} = \text{Coefficient } \alpha \times \text{BC pressure} \times \text{Duration of BC pressure} \times \text{Speed} \tag{1}$$

Formula (1) expresses a cumulative value of pressure applied when the friction material is pressed against the wheel tread of the railway vehicle 100. At step S53, since the speed is 0, the set value becomes 0 regardless of a value of the coefficient. Therefore, the set value determination unit 36*a* determines that the set value be 0.

If the railway vehicle 100 is running (step S52: No), the set value determination unit 36*a* determines whether a regenerative brake is ON with the BC pressure in a precharge state or not (step S54). The set value determination unit 36*a* can determine whether or not the regenerative brake is ON with the BC pressure in the precharge state for the railway vehicle 100 on the basis of the driving information. If the regenerative brake is ON with the BC pressure in the precharge state (step S54: Yes), the set value determination unit 36*a* determines a set value by computing the set value (step S55). At this time, the set value determination unit 36*a* sets the coefficient α in Formula (1) to a negative value. This means that the set value computed at step S55 becomes a negative value. If "the regenerative brake is ON with the BC pressure in the precharge state" is not the case (step S54: No), the set value determination unit 36*a* determines a set value by computing the set value (step S56). At this time, the set value determination unit 36*a* sets the coefficient α in Formula (1) to a positive value. This means that the set value computed at step S56 becomes a positive value.

The set value determination unit 36*a* outputs the set value determined at step S53, S55, or S56 to the tread roughness estimation unit 37*a*. The tread roughness estimation unit 37*a* computes an up-to-date wheel tread roughness by adding the set value to the previously computed wheel tread roughness, namely the current value (step S57). As described above, the set value determination unit 36*a* of the wheel tread roughness computation unit 34*a* determines the set value by computing the set value through the use of the specific arithmetic expression that uses the driving information and the vehicle information. For initial computation after the railway vehicle 100 begins operating, the tread roughness estimation unit 37*a* of the wheel tread roughness computation unit 34*a* uses the up-to-date wheel tread roughness last computed in a preceding operation or a wheel tread roughness measured in an inspection as the preceding wheel tread roughness. The tread roughness estimation unit 37*a* outputs the computed up-to-date wheel tread roughness to the output unit 38. The output unit 38 outputs the up-to-date wheel tread roughness obtained from the tread roughness estimation unit 37*a* as wheel tread roughness information (step S58).

In the example of FIG. 8, the set value determination unit 36*a* computes the set value when a brake signal is present in the railway vehicle 100; however, this is not limiting. Even when the brake signal is not present in the railway vehicle 100, the set value determination unit 36*a* may compute a set value, using, for example, values obtained during power running or coasting.

A description is provided next of a hardware configuration of the wheel tread roughness estimation device 30*a* according to the second embodiment. The driving information acquisition unit 31, the vehicle information acquisition unit 32, the wheel tread roughness computation unit 34*a*, and the output unit 38 of the wheel tread roughness estimation device 30*a* are implemented with processing circuitry. The processing circuitry may include a memory that stores programs and a processor that executes the programs stored in the memory or may be dedicated hardware.

As described above, the wheel tread roughness estimation device 30*a* according to the present embodiment determines the set value by computing the set value, using the driving information and the vehicle information, computes the up-to-date wheel tread roughness by adding the set value to the preceding wheel tread roughness, and outputs the up-to-date wheel tread roughness as the wheel tread roughness information to the wheel tread roughening control device 10. Therefore, the wheel tread roughness estimation device 30*a* is capable of accurate estimation of the wheel tread roughness without being affected by vibration of the railway vehicle 100 even during running.

The above configurations illustrated in the embodiments are illustrative, can be combined with other techniques that are publicly known, and can be partly omitted or changed without departing from the gist. The embodiments can be combined with each other.

REFERENCE SIGNS LIST

10 wheel tread roughening control device; 21 environment information acquisition unit; 22 service route information acquisition unit; 30, 30*a* wheel tread roughness estimation device; 31 driving information acquisition unit; 32 vehicle information acquisition unit; 33 tread roughening control information acquisition unit; 34, 34*a* wheel tread roughness computation unit; 35 database; 36, 36*a* set value determination unit; 37, 37*a* tread roughness estimation unit; 38 output unit; 40, 40*a* wheel tread roughness management system; 100 railway vehicle; 101 speed sensor; 102 brake command unit; 103 brake control unit; 104 electro-pneumatic conversion valve; 105 relay valve; 106 pressure sensor; 107 brake cylinder; 108 brake shoe; 110 wheel; 112 main air reservoir; 114 regenerative brake control unit.

The invention claimed is:

1. A wheel tread roughness estimation device comprising:

driving information acquisition circuitry to obtain driving information of a railway vehicle;

vehicle information acquisition circuitry to obtain vehicle information of the railway vehicle in service;

wheel tread roughness computation circuitry to determine a set value on a basis of the driving information and the vehicle information and compute an up-to-date wheel tread roughness by adding the set value to a preceding wheel tread roughness indicating a previously computed roughness of a wheel tread; and output circuitry to output the up-to-date wheel tread roughness computed by the wheel tread roughness computation circuitry as wheel tread roughness information for performing ON/OFF control of a wheel tread roughening operation.

2. The wheel tread roughness estimation device according to claim 1, comprising tread roughening control information acquisition circuitry to obtain tread roughening control information from a wheel tread roughening control device connected to the wheel tread roughness estimation device, the tread roughening control information being information on wheel tread roughening control in the wheel tread roughening control device, wherein the wheel tread roughness computation circuitry selects, on a basis of the driving information, the vehicle information, and the tread roughening control information, the corresponding set value from a set value table configured according to the driving information, the vehicle information, and the tread roughening control information, and determines the selected set value as the set value.

3. The wheel tread roughness estimation device according to claim 1, wherein the wheel tread roughness computation circuitry obtains environment information including at least one of weather, temperature, or humidity and determines the set value, using the environment information.

4. The wheel tread roughness estimation device according to claim 1, wherein the wheel tread roughness computation circuitry obtains service route information and determines the set value, using the service route information, the service route information being information on a route where the railway vehicle runs.

5. The wheel tread roughness estimation device according to claim 1, wherein the wheel tread roughness computation circuitry computes the set value through use of a specific arithmetic expression that uses the driving information and the vehicle information, and determines the computed set value as the set value.

6. The wheel tread roughness estimation device according to claim 1, wherein the wheel tread roughness computation circuitry is to have a negative value for the set value when the wheel tread is in a situation of becoming a mirror surface and a positive value for the set value when the wheel tread is in a situation of becoming rough.

7. The wheel tread roughness estimation device according to claim 1, wherein for initial computation after an operation begins, the wheel tread roughness computation circuitry uses, as the preceding wheel tread roughness, the up-to-date wheel tread roughness last computed in a preceding operation or a wheel tread roughness measured in an inspection.

8. A wheel tread roughness estimation method to be performed, the wheel tread roughness estimation method comprising:

obtaining driving information of a railway vehicle;

obtaining vehicle information of the railway vehicle in service;

determining a set value on a basis of the driving information and the vehicle information and computing an up-to-date wheel tread roughness by adding the set value to a preceding wheel tread roughness indicating a previously computed roughness of a wheel tread; and outputting the up-to-date wheel tread roughness computed as wheel tread roughness information for performing ON/OFF control of a wheel tread roughening operation.

9. The wheel tread roughness estimation method according to claim 8, comprising obtaining tread roughening control information from a wheel tread roughening control device connected to the wheel tread roughness estimation device, the tread roughening control information being information on wheel tread roughening control in the wheel tread roughening control device, wherein when determining the set value, on a basis of the driving information, the vehicle information, and the tread roughening control information, the corresponding set value is selected from a set value table configured according to the driving information, the vehicle information, and the tread roughening control information, and the selected set value is determined as the set value.

10. The wheel tread roughness estimation method according to claim 8, wherein when determining the set value, environment information including at least one of weather, temperature, or humidity is obtained, and the set value is determined using the environment information.

11. The wheel tread roughness estimation method according to claim 8, wherein when determining the set value, service route information is obtained, and the set value is determined using the service route information, the service route information being information on a route where the railway vehicle runs.

12. The wheel tread roughness estimation method according to claim 8, wherein when determining the set value, the set value is computed through use of a specific arithmetic expression that uses the driving information and the vehicle information, and the computed set value is determined as the set value.

13. The wheel tread roughness estimation method according to claim 8, wherein when determining the set value a negative value is set for the set value when the wheel tread is in a situation of becoming a mirror surface and a positive value is set for the set value when the wheel tread is in a situation of becoming rough.

14. The wheel tread roughness estimation method according claim 8, wherein when determining the set value, for initial computation after an operation begins, as the preceding wheel tread roughness, the up-to-date wheel tread roughness last computed in a preceding operation or a wheel tread roughness measured in an inspection is used.

* * * * *